(12) United States Patent
Ordille et al.

(10) Patent No.: US 8,903,076 B2
(45) Date of Patent: Dec. 2, 2014

(54) EXTERNAL CONTACT CENTER DATA COLLECTION AND MEASUREMENT

(71) Applicant: Avaya Inc., Basking Ridge, NJ (US)

(72) Inventors: Joann J. Ordille, Lebanon, NJ (US); Valentine C. Matula, Granville, OH (US); Ramanujan Kashi, Thalaghattapura (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/037,724

(22) Filed: Sep. 26, 2013

(65) Prior Publication Data

US 2014/0314226 A1    Oct. 23, 2014

Related U.S. Application Data

(60) Provisional application No. 61/813,567, filed on Apr. 18, 2013.

(51) Int. Cl.
*H04M 3/00* (2006.01)
*H04M 5/00* (2006.01)
*H04M 3/523* (2006.01)

(52) U.S. Cl.
CPC ................... *H04M 3/523* (2013.01)
USPC ........... 379/265.02; 379/265.11; 379/265.12; 379/265.13; 379/265.14

(58) Field of Classification Search
USPC ............. 379/265.02, 265.11, 265.12, 265.13, 379/265.14
See application file for complete search history.

(56) References Cited

U.S. PATENT DOCUMENTS 6,741,698 B1 * 5/2004 Jensen ..................... 379/265.02

* cited by examiner

*Primary Examiner* — Quynh Nguyen
(74) *Attorney, Agent, or Firm* — Sheridan Ross P.C.

(57) ABSTRACT

External queue monitoring of contact center queues is provided as a means that may better service the customer and measure service level objectives. External queue monitoring provides the opportunity for real-time monitoring of the queue and modification of contact center operations, such as devices routing queue members, in response to queuing or enqueued customers.

20 Claims, 5 Drawing Sheets

EXTERNAL CONTACT CENTER DATA COLLECTION AND MEASUREMENT

FIELD OF THE DISCLOSURE

The present disclosure is generally directed toward communications and more specifically toward contact centers.

BACKGROUND

Contact centers may monitor their own activity level and adjust their responses according to those levels. If contact center activity is unusually high, the contact center may forego certain time-intensive activities in favor of shortening each contact session and, hopefully, reduce any backlogs or increase the number of contact sessions. Conversely, during a period of low activity, the contact center may initiate additional or more time-intensive activities in order to better utilize contact center equipment and personnel.

One of the means by which contact centers determine activity is by wait times for contacts enqueued and waiting for a resource, such as an agent. In the case of telephony-based contacts, calls may roll over to a dedicated busy line, that is, a line that is used only when all other phone lines are in use and provides a busy signal to the caller.

Contact centers may also look to generalized environmental factors. For example, a contact center handling airline reservations may utilize a weather forecasting service. Upon determining a high likelihood of a major storm hitting the airline's hub, the contact center may anticipate higher contact center utilization as the airlines customers react to cancelled flights. Other factors include patterns associated with time, day, date or season and the historical level activity associated therewith.

Despite considering many factors, contact centers can still find themselves unaware of a change in the level of activity or the type of activity.

SUMMARY

It is with respect to the above issues and other problems that the embodiments presented herein were contemplated. This disclosure proposes, among other things, the use of external monitoring operable to inform the contact center of enqueuing and/or enqueued customers and enable the contact center to respond accordingly. External monitoring is provided via means external to queue itself and may or may not be external to the contact center.

Embodiments described herein are generally directed towards an external means to collect data relevant to a contact center, and then uses the data for reporting, planning, and real-time adjustments of contact center operations.

In situations where customers are calling the contact center from kiosks, a variety of techniques can be used to determine the number of customers waiting for access to a kiosk, including but not limited to:

1. A Wi-Fi receiver in the kiosk or in the surroundings of the kiosk can be used to determine the number of cellular telephones in the area. The number can be normalized by the percentage of cellular telephones that typically have Wi-Fi enabled in the local geographic area (e.g. 80% of total cell phones) to give an estimate of the number of people waiting for access to the kiosk (e.g. measured number×1.25);

2. Video of the environment around the kiosk can be used to count the number of people waiting in line or in the vicinity of the kiosk; and 3. A cellular telephone application can be supplied to customers, so they can self-report and report difficulties in gaining access to the kiosk (waiting in line).

Similarly, when calls originate from the customer's voice network endpoint (such as a cellular telephone or wired telephone):

1. A service provider can provide date, time, and caller ID on busy calls to the contact center.

Similarly, when calls originate from the customer's Internet endpoint such as a PC, tablet or Wi-Fi-enabled cellular telephone:

1. An Internet access point can provide data on calls rejected due to lack of resources, and the data may include identifying information on the caller;

2. An Internet application can be given to a customer, so they can self-report and report difficulties in gaining access to the contact center; and 3. Intermediate systems (Firewalls, SBCs, control routers) can report lost or denied sessions due to congestion, lack of bandwidth, lack of availability of codec transcoding resources, etc.

When the measurement technique provides a count, changes in the count can be compared to a service rate. If the count decreases more quickly than the service rate, the difference represents customers who abandoned their attempt to use the kiosk. When the measurement technique provides identifying information about the customer, the contact center data can be checked to see if the customer succeeded in obtaining service and when (thereby giving an estimate of the wait interval), or information as to whether or not the customer abandoned the attempt.

For example, an ATM or kiosk service team may be able to vary the types of transactions that can be conducted at a kiosk, based on whether people are waiting in line to use the device. Capturing pre-kiosk wait times, number of people abandoning from pre-kiosk queues, etc. would be valuable input used to modify decisions algorithmically, such as routing, number of agents, etc.

In another example, web pages may be enabled with 'click to talk using your pc' capability via Flash or HTML5/WebRTC. From the perspective of a contact center, call queues may have short waiting time (agents are available to serve customers as they connect). However, if customers are having difficulty making the connection due to lack of web server resources, lack of bandwidth at the edge of the Internet/enterprise boundary, etc., then the contact center may wish to reduce the option to click to talk to only their most premium customers to reserve bandwidth.

There are many ways in which a customer can interact with a contact center. Making a telephone call to a company's customer service department is one method. Other methods include alternate channels, such as text messaging, text chat, video chat, voice-over-IP and email. Alternative hardware interfaces used by the customer to connect with the contact center include a plan-old-telephone-system (POTS) telephone, cellular telephone, texting device, personal computer, portable computer, smartphone, kiosk, dedicated machine (e.g., automated teller machine) and the like.

Although prior art contact centers may be aware of internal utilization indicators associated with enqueued customers, prior art contact centers are largely unaware of external indicators. For example, a contact center may be aware of the number of contacts who have initiated a text chat session with the contact center and are waiting for an agent to become available. However, contact centers are unaware of the status and/or purpose of the enqueued chat sessions. Furthermore, customers often utilize the contact center via other means, such as a kiosk. A contact center interface, such as a kiosk, may be in use or not in use. The status of in use/not in use may be known to the contact center. Via some of the embodiments contemplated herein, the contact center may be informed that at least one customer is enqueued and waiting to use the kiosk, the number of customers enqueued, the number and/or rate of customers enqueuing, and/or attributes associated with the enqueued customers.

As used herein, the term "external" is broadly embodied and not intended to be a description of the physical boundary but rather a point of reference that observes the queue.

As a benefit of implementing the embodiments herein a contact center may know if, when, how many, and/or attributes associated with enqueued/enqueuing customers, the contact center may respond accordingly and more effectively service the customers and comply with service level objectives of the client and/or the contact center.

The term "customer" as used herein refers to the user of the contact center for a purpose provided by the contact center. The user may be a customer, when utilizing the contact center to purchase of goods or services, however, other uses are also contemplated herein. Users seeking information from, or providing information to, the contact center are also considered "customers." Furthermore, as an enqueuing/enqueued customer may leave the queue, the term "customer" also includes individuals who may only provide an indication of becoming a customer over the population similarly situated but not providing any indication of becoming a customer.

In one embodiment, a method of operating a contact center is disclosed, comprising: receiving, via an electronic communications connection to the contact center, indicia of an enqueued customer of the contact center; determining, by a processor of the contact center, a response to the enqueued customer; and modifying a device directing access to the contact center in accord with the determined response.

In another embodiment, a contact center system is disclosed, comprising: a processor; a network interface; wherein the network interface is operable to connect, and enable signals therebetween, (i) the contact center to a number of contacts and (ii) the contact center to a queue monitor; and wherein the processor is operable, in response to signals received by the network interface from the queue monitor, to cause the processor to modify a device directing access to the contact center.

In still another embodiment, a queue management device is disclosed, comprising a monitor, operable to report attributes associated with queue utilization to a processor; the processor, operable to modify a queue environmental factor in response to the reported attribute; and wherein the queue environmental factor is operable to direct at least one of (i) time an individual in the queue remains in the queue unprocessed, (ii) time an individual in the queue is processed, and (iii) the placement of an individual in the queue into a determined sub-queue.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Furthermore, while embodiments of the present disclosure will be described in connection with queued or attempted users of a contact center, it should be appreciated that embodiments of the present disclosure are not so limited. In particular, embodiments of the present disclosure can be applied to any contact center construct and, in some embodiments, may also be utilized in non-contact center settings. For instance, any communication system whereby one or more elements are queued may benefit from the teachings herein. The usage of contact center examples is for illustrative purposes only and should not be construed as limiting the claims.

In the figures herein, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

Figure 1:
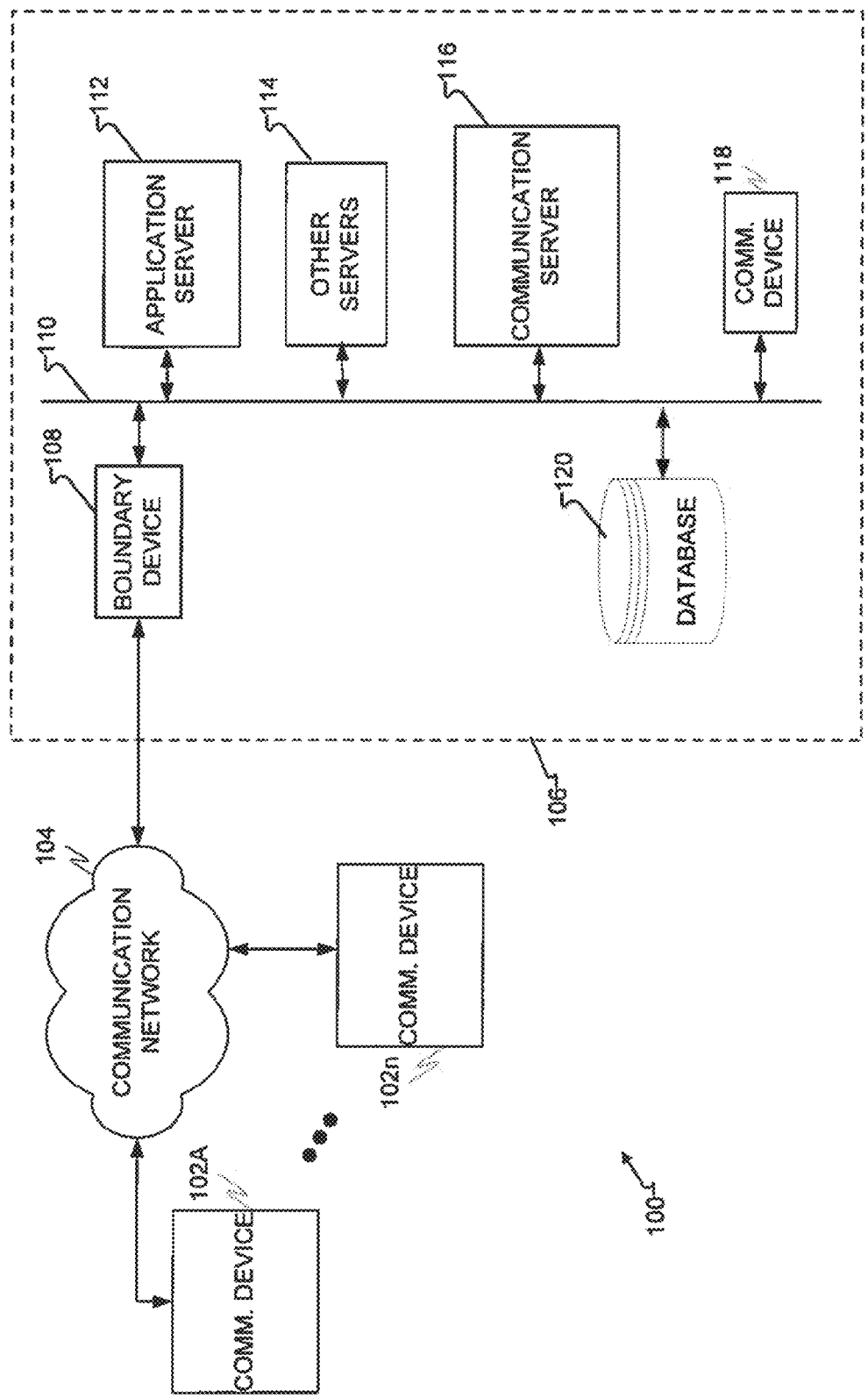
FIG. 1 is a block diagram of a communication system in accordance with embodiments of the present disclosure.

FIG. 1 shows an illustrative embodiment of a communication system 100 in accordance with at least some embodiments of the present disclosure. Communication devices 102 include any hardware operable to communicate with contact center 106. Communication devices 102 include, but are not limited to, plain old telephone service (POTS), cellular telephones, smart phones, and devices operable to provide other communication channels, such as, voice over IP, text messages, instant messages, social media messaging, social media chat, text chat, video chat, email, and the like.

In one embodiment, communication devices 102 connect to communications network 104 to access contact center 106, via boundary device 108. Internal to contact center 106, boundary device 108 provides two way communication via components in communication with bus 110. Such components include application server 112, operable to provide one or more applications to contacts. Other servers 114 include internal management servers, routing engines, schedulers and/or other services. Communication server 116 provides connectivity and/or other communications services to facilitate a connection with customers, such as those using communication devices 102, to human and/or automated agents. Database 120 provides a repository of information to handle and process contacts. Communication devices 118 provides contact center communications and may include a live agent via voice, text, video and/or email, an interactive voice response ("IVR") system, or other communications services.

In one embodiment, communication device 102A is a telephony device used by a caller or callee to connect with contact center 106. In the case where the customer is the caller, the caller may experience a busy signal or busy tone. The source of the busy signal may be the carrier, such as when communication network 104 includes a telephone company with no free circuits available. Another source of the busy signal occurs when boundary device 108 is a switch programmed to dedicate unanswerable calls to a dedicated line playing a busy signal. For instance, if contact center 106 has the ability to accept fifty calls simultaneously, boundary device 108 may be configured to route the fifty-first call to a dedicated line that plays a busy signal to the caller. Callers hearing the busy signal typically will hang up within a few seconds and may call again later. Operators of contact center 106 may then look at the number of calls handled by the fifty-first line and determine a minimum number of calls rejected. While useful, such information only reports a portion of the denied calls.

To continue the example, if the fifty-first line was never utilized, callers may still be denied access to contact center 106 due to carrier congestion or other issues. As utilization increases, it becomes less and less clear if the fifty-first caller is an accurate portrayal of the contact center. For example, if the fiftieth line has a high degree of utilization, calls routed to the fifty-first line, to be played a busy signal, even if only for a few seconds, may tie up the fifty-first line such that a significant number of fifty-second caller is not detected. While determining the cause of every rejected call would require access to telephone company equipment, improvements to the state of the art may still be made without such access.

Figure 2:
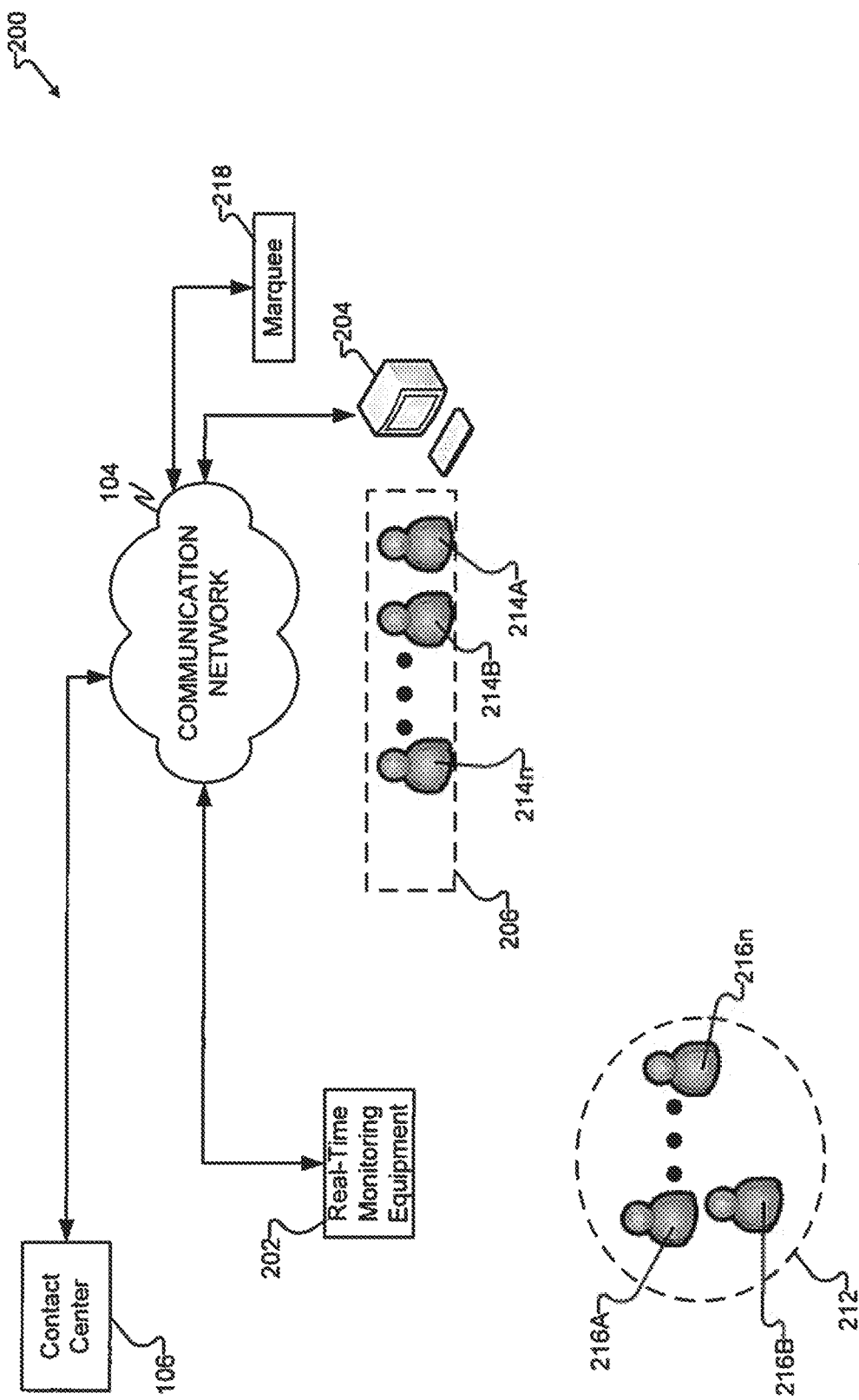
FIG. 2 is a plan view of an area, with a kiosk and queue, in accordance with embodiments of the present disclosure.

FIG. 2 is a plan view of area 200 with kiosk 204 and queue 206 in accordance with embodiments of the present disclosure. Individuals 214A-214n are enqueued or utilizing kiosk 204. Individuals 216A-216n are queuing to utilize kiosk 204. External monitoring equipment 202 is configured to monitor queue 206 and/or queuing area 212 and connect to contact center 106 via communication network 104. Kiosk 204 is configured to interact with individual 214A currently utilizing kiosk 204 and connect to contact center 106 via communication network 104. In other embodiments, kiosk 204 and/or external monitoring equipment 202 may utilize another communications network and/or connect to an intermediate service that, in turn, is connected to contact center 106.

Queue 206 may be formally defined, such as with cordons or other physical barriers, or informally. Informal queues may form as a result of human behavior alone or in concert with the environment. For example, in many instances, humans will form substantially linear queues, substantially perpendicular to the reason for queuing. In other instances, humans will form queues to conform to other obstacles in a manner that can generally be predicted. In other embodiments, queues may be less linear and/or orderly. For example, queues may form whereby a larger number of individuals funnel to a central point or points.

External monitoring equipment 202 may observe and report individuals or a sampling of individuals. Reporting individuals may be provided by external monitoring equipment being a camera operating in the visual or non-visual spectrum, such as infrared. In such embodiments, an exact number of individuals, subject to some margin of error, may be reported. In other embodiments, an estimated number of individuals may be observed and/or reported. For example, it may have been previously determined that when at least one individual 214 is detected as enqueued at a certain location (e.g., twenty feet from kiosk 204), the number of individual within queue 206 is known within a certain accuracy (e.g., approximately the eighth person in the queue will be enqueued twenty feet from kiosk 204). In a further embodiment, external monitoring equipment 202 may report the size of queue 206 and/or enqueuing area 212 as being above or below a threshold.

Individual 214A may be actively utilizing kiosk 204 or enqueued to utilize kiosk 204. For example the first enqueued individual 214A may be waiting for kiosk 204 to boot, power-up, reset or perform a similar procedure whereby kiosk 204 is not ready to interact with individual 214A. Furthermore, kiosk 204 may be experiencing a fault or is otherwise presently unable to provide a service. For example, cleaning or other operations at the facility hosting kiosk 204 may temporarily prevent kiosk 204 from being accessed. Similarly, individual 214A may be unable to immediately interact with kiosk 204 even if kiosk 204 is ready to perform such operation. For example, individual 214A may have approached kiosk 204 and discovered that information required or helpful to individual's 214A purpose or ability to interact with kiosk 204 (e.g., account number, flight information, and so on) is not currently available to individual 214A but accessible (e.g., trying to recall previously memorized information or retrievable by searching through baggage, documentation, information stored on a smart phone, et cetera). During such events, kiosk 204 is not in use and may even indicate to contact center 106 that it is not in use. However, such an indication fails to provide a true picture of the utilization of kiosk 204. For example, individuals 214B-214n may be enqueued in queue 206 and/or individuals 216A-216n may be approaching queue 206 through enqueuing area 212 with the purpose of utilizing kiosk 204. Once individual 214A begins utilizing kiosk 204, kiosk 204 may report to contact center 106 that it is in use.

External monitoring equipment 202 is configured to monitor queue 206 and/or enqueuing area 212. In one embodiment, external monitoring equipment 202 observes the number of people not queued, queued, queuing, leaving the queue, and/or attributes about the people and/or attributes associated with how they are enqueued. More detailed embodiments of external monitoring equipment 202 are provided with respect to FIG. 3. External monitoring equipment 202 reports to contact center 106 via communications network 104. As a result contact center may in turn alter activities to better meet at least one service objective of contact center 106.

In one embodiment, contact center 106 may operate as if kiosk 204 is in heavy demand based on external monitoring equipment 202 observing a relatively large number of individuals in queue 206 and/or enqueuing area 212. In another embodiment, contact center 106 may operate as if kiosk 204 is in low demand based on external monitoring equipment 202 observing a relatively small number of individuals in queue 206 and/or enqueuing area 212. In yet another embodiment, contact center 106 may alter the operation of kiosk 204 and/or the environment in which kiosk 204 operates.

In one embodiment, in response to contact center 106 determining the size of the queue for kiosk 204, at least in part by observations reported by external monitoring equipment 202, contact center 204 may alter at least one operating parameter of kiosk 204. For instance, individual 214A may be presented with additional information or offers by kiosk 204 during low demand or such information or offers omitted during high demand. Contact center 106 may modify a device affecting the environment of kiosk 204. For example, a device, such as marquee 218 may provide audio, video, and/or textual information to one or more individuals 214 and/or 216, such as, the wait time remaining, services available, services not available, alternative sources of service, and the like. In a further embodiment, marquee 218 may provide information about kiosk 204 via radio, infrared or other communications medium to devices carried or available to individuals 214 and/or 216.

In other embodiments, contact center 106 provides programming or other instructions such that at least a portion of the responses made by kiosk 204 and/or marquee 218, in response to observations of external monitoring equipment 202, are made without requiring connectivity with contact center 106.

In another embodiment, dequeuing/dequeued individuals may be determined. Certain queues may have a specific or determinable exit point or other means by which individuals dequeuing, such as by completing their business with kiosk 204, or abandoning queue 206 may be determined and reported, or excluded from the queued/enqueuing reporting. In a further embodiment, enqueuing area 212 indicates substantially all individuals in area 200 and optionally exclude those identified as enqueued in queue 206.

Figure 3:
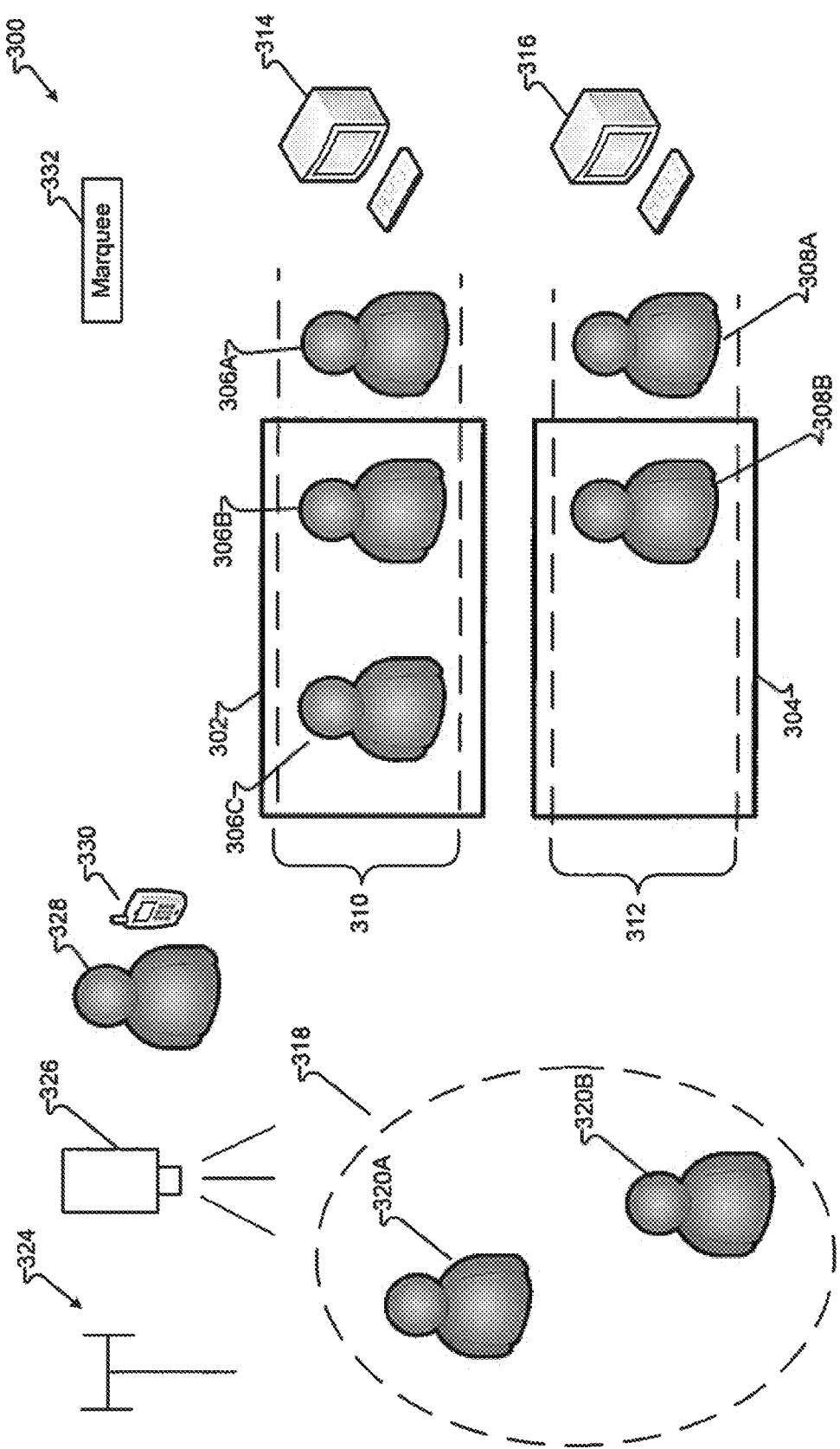
FIG. 3 is a plan view of an area with terminals and queues for each terminal in accordance with embodiments of the present disclosure.

FIG. 3 is a plan view of area 300 with terminals 304, 308 and queues 310, 312 for terminals 314, 316, respectively, in accordance with embodiments of the present disclosure. Queues 310, 312 and/or enqueuing area 318 may be monitored by external monitoring equipment 202 and reported to contact center 106 (see, FIG. 2). Embodiments of external monitoring equipment 202, include but are not limited to, one or more of, foot sensors 302, 304, camera 326, antenna 324, human observer 328 with a connecting device, such as smart phone 330, and other means of detecting a number of people directly or indirectly. In a further embodiment, human observer 328 may be at least one of queued or enqueuing individuals 306, 308, or 320.

Embodiments of indirect detecting of the number of individuals enqueued include foot sensors 302, 304 and antenna 324. Foot sensors 302, 304 are configured to observe a weight thereon. An estimate of the number of individuals represented by such a weight may then be determined. Situational modification may also be provided in conjunction with an indirect measurement. For example, the weight of individuals enqueued at an international airport terminal, prior to baggage check-in, may accommodate for the a greater amount of luggage weight as opposed to a similar queue located after baggage check-in. Additionally, adjustments may be employed to compensate for the fact that individuals may stand farther apart when carrying luggage versus when they are not carrying luggage. Other adjustments may consider the probability of children or other factors whereby a weight can be more accurately mapped to a number of enqueued individuals.

Foot sensors 302, 304 are illustrated as not including a first member of the queue, more specifically, individuals 306A and 308A. One advantage of excluding the individual most likely engaged with the queue is that, once calibrated and "zero'ed," foot sensors 306A and 308A may indicate zero when not in use and be a more readily determined indicator of no enqueued individuals, other than a potential user of terminal 314 and/or 316.

In another embodiment, antenna 324 may observe radio signals associated with cellular telephones, WiFi connected/connectable devices, or other sources of radio frequency emissions associated with, or likely associated with, individuals who may be queued/enqueuing. As an example, if a given population likely to be encountered in a queue carry a WiFi enabled device at a rate of fifty percent, and antenna 324 and associated observing equipment detect ten WiFi devices in an area associated with a queue, then it may be determined that twenty individuals are enqueued. In another embodiment, the utilization of a queue may be considered within an observing area. As an example, if ten WiFi-enabled devices are detected in an area incorporating a queue, previous observations or other means may indicate a likelihood of half of the individuals in the area are queued. Therefore, if ten WiFi-enabled devices is indicative of twenty individuals in an area, and of the number of individuals in the area is generally determined to be half enqueued in a queue—it may then be estimated that ten individuals are enqueued.

In another embodiment, camera 326 may serve as external monitoring equipment 202. Camera 326 may be operational in the visual, infrared, ultraviolet and/or other spectral band. Equipment associated with camera 326 (not shown) may process raw images into shapes and count the shapes or otherwise determine and/or estimate the number of individuals within a particular frame or number of frames.

In one embodiment, contact center 106 may modify a device affecting its own operations and/or the operations of area 300 in response to the size of queue 310, 312 and/or enqueuing area 318. In one embodiment marquee 332 is provided to provide informational information individuals 306, 308 and/or 320 of area 300. Marquee 332 may be embodied as a single display or a plurality of displays as well as providing information via text, video, audio or radio or infrared signals to individuals 306, 308, and/or 320 and/or devices operable to receive such messages. Marquee 332 may instruct individuals 306, 308 and/or 320 where to queue (e.g., "Premiere customers this line"), who should queue (e.g., "Passengers with fruits or vegetables must obtain an inspection stamp here"), services offered (e.g., "ATM is currently unavailable for deposits"), alternative sources of services (e.g., "Customers wishing to make a deposit may visit a teller on the main level"), information about the queue (e.g., "Approximate wait time –6 minutes") and/or other information as determined by contact center 106 or by instructions provided by contact center 106. As a benefit, contact center 106 may better utilize resources and achieve objectives.

In one embodiment, queue 310 is for terminal 314 which is configured to be an automated teller machine ("ATM") and queue 312 is for terminal 316 which is also configured to be an ATM. Both ATMs 314 and 316 are operable to perform a variety of banking services, such as, withdrawals, deposits, balance inquiries, loan payments, transfers, and payments to other entities (e.g., utility companies, credit card issuers, et cetera). Contact center 106 may be, or be operating under, a bank which operates the ATM terminals 314, 316. During periods whereby queue 310, queue 312 and/or enqueuing area 318 are experiencing a high volume, contact center 106 may cause marquee 332 to indicate that ATM terminal 316 is operational for withdrawals only—a common and relatively quick operation. ATM terminal 314 is operational for additional and more time consuming operations. In a further embodiment, foot sensor 302 may determine the size of queue 310 is a particular size and foot sensor 304 may determine the size of queue 312 is a second size. Upon determining the size and/or ratio of individuals enqueued at queue 310 and 312, marquee 332 may indicate that both ATM terminals 314 and 316 are available for all transactions.

In another embodiment, terminals 314 and 316 are airline ticket counters and may represent two a large number of other ticket counters (not shown). The configuration of airline ticket counter may automatically be changed in response to queue sizes to better accommodate the airline's frequent flyer program members. For example, at a particular airport, the airline's lane 1 is closest to the gate and therefore most desirable to be used by customers. The airline prefers to utilize the lowest numbered lanes for its most valuable fliers; more specifically it prefers to utilize these lanes for those individuals who have achieved the highest level of its frequent flier program (e.g., "gold" level members). The next lowest lane for its "silver" level members and so down to general public lanes. For gold level members, a short wait is acceptable however; underutilized lanes are undesirable to the silver level members and to the airline. Therefore, the in times of high activity, a device may configure the first ten lanes to support highest level frequent flyers, the next twenty lanes for the middle level frequent fliers, the next twenty lanes for entry level frequent fliers and the remaining lanes for passengers who are not members of the airline's frequent flyer program.

Continuing the embodiment, terminal 314 is check-in lane number ten and terminal 316 is check-in lane number 11. Fliers 306, 308 enqueue based on their self-determined status (e.g., "gold" level members enqueue in queue 310 and "silver" level members enqueue in queue 312). Upon foot sensor 302 determining queue 310 has reached a first threshold, marquee 332 may then be altered to indicate that queue 312 is not longer for "silver" level members. Marquee 322 may immediately switch from "silver" to "gold" or may go through an intermediate phase (e.g., blank or "closed") in order to reduce confusion for those who are already enqueued.

Figure 4:
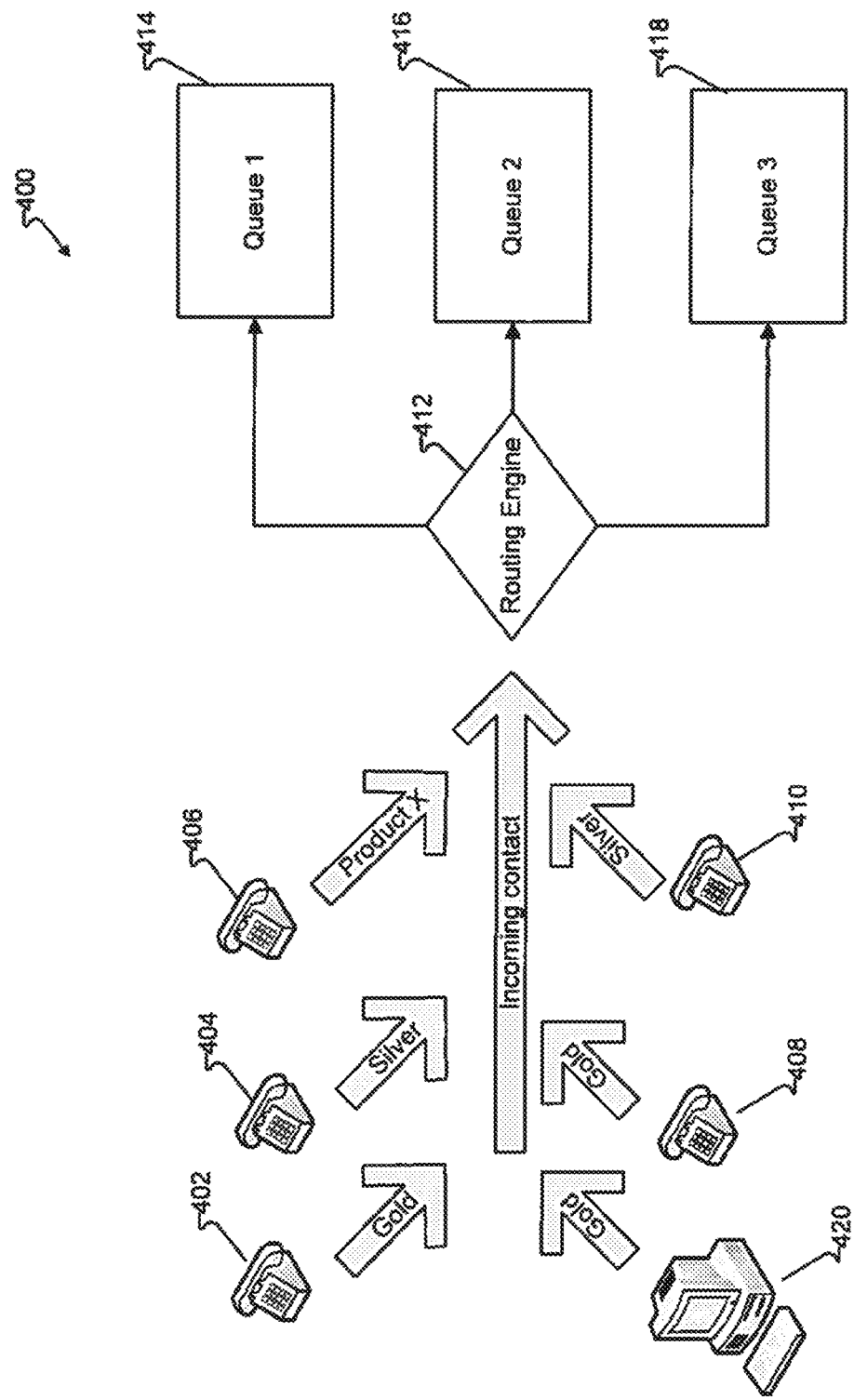
FIG. 4 is a block diagram of a routing process in accordance with embodiments of the present disclosure.

FIG. 4 is a block diagram of a routing process 400 in accordance with embodiments of the present disclosure. Callers 402, 404, 406, 408 and 410 are calling into contact center 106. While the embodiment illustrated and the description thereof is with respect to POTS telephones, other communications means, including but not limited to, cellular telephones, SMS text messaging, video chat, voice over IP, and other means are also contemplated.

In one embodiment, callers 402, 404, 406, 408 and 410 call contact center 106 whereby they designate themselves or are otherwise designated as falling into one of three categories corresponding to sub-queues, such as queue 1 (414), queue 2 (416) and queue 3 (418). A customer may be considered enqueued upon the first determination of an attempt to interact with the contact center 106. Such a determination may occur upon initial detection of the incoming call to the contact center.

Various categorization methods may be employed to categorize callers 402, 404, 406, 408 and 410. For example, callers 402, 404, 406, 408 and 410 may be presented with an interactive voice response ("IVR") application whereby they answer a question or press a number in response to a question. One question may solicit the answer to their "level," reflecting a next queue, and receive an appropriate response. For example, caller 402 is a member of a frequent flier program and may know or believe than they are "gold" level members and indicate themselves as such. Caller 408 may also be a "gold" level member but not realize it recall their status. For example, caller 408 may indicate that they flew twenty-thousand miles last year and thereby be determined to be a "gold" level member. Caller 404 may utilize an agent, such as to provide translation services, and indicate "silver" level membership. Caller 410 may provide a frequent flyer number and be determined to be a "silver" level member. Routing engine 412 may then route the "gold," "silver," and "other" calls to queues 1 (414), 2 (416), and 3 (418), respectively. Additionally, caller 406 may have indicated interest in a particular good or service (e.g., "Product X") and contact center 106 has configured that such product inquires should cause routing engine 412 to route such calls to queue 2 (416).

Contact center 106 may utilize queues 1 (414), 2 (416), and 3 (418), and the number of waiting callers, and modify the behavior of contact center 106. In one embodiment, once queue 1 (414) reaches a threshold, callers are asked additional and/or alternative questions in order to better filter out the placing of calls into queue 1 (414). During times of low activity, callers may be asked fewer and/or alternate questions such that routing engine 412 directs more calls to queue 1 (414). In another embodiment the interactivity with contacts provided by the agents may be dynamically configured based on the size of queues 1 (414), 2 (416), and 3 (418) and/or a callers membership in a particular queue.

In another embodiment, calls that fail (e.g., disconnects) may be identified by caller-id to identify in whole (e.g., an entire telephone number associated with a specific individual) or in part (e.g., an unknown caller from a hotel lobby), the identity of the caller. Other intermediate systems, such as firewalls, routers, boarder controllers, and the like may report sessions initiated or attempted. The discrepancy between the number of initiated or attempted sessions and sessions actually started and/or completed, may then be used to identify technical issues and/or attributes associated with the individuals who's sessions fails. Having such information may be useful in determining service objective metrics. In a further embodiment, a device routing calls to a particular resource may modified to direct fewer or no calls to the particular resource, if that particular resource is determined, or suspected, to be a cause of failed connections.

In another embodiment, an internet protocol ("IP") device, such as personal computer 420, attempts to establish a session with contact center 106. IP devices may attempt to connect but fail or have the connection terminated. However, IP devices may indicate a packet number or some unique or semi-unique identifier. The identifier may then be used to identify connection attempts, sessions not completed, and/or the individual(s) associated with the identifier. As a result, contact center 106 may then modify their activity to better ensure appropriate connectivity, capacity and routing.

Figure 5:
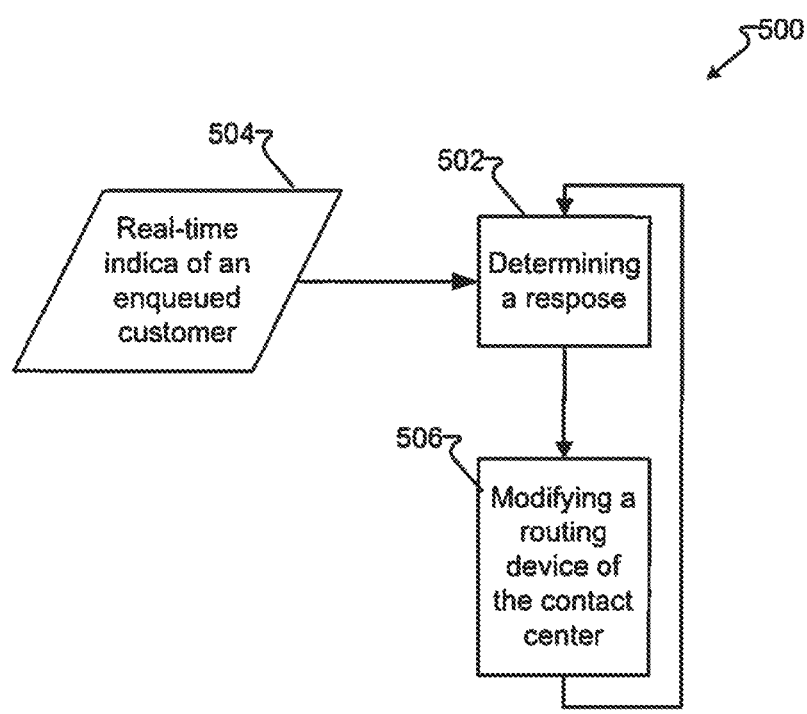
FIG. 5 is a flowchart in accordance with embodiments of the present disclosure.

FIG. 5 illustrates flowchart 500 in accordance with embodiments of the present disclosure. In one embodiment, data 504 is received that is external indicia of an enqueued customer. A processor, such as one executing on a server 112 and/or 114 in contact center 106, performs step 502 whereby a response is determined to data 504. The processor then performs step 506 to cause the contact center to be modified in accordance with the determined response.

In one embodiment, data 504 is external indicia of the number of enqueued customers. In another embodiment, data 504 is external indicia of an attribute of the customer. Further embodiments of the attribute of the customer include membership in an organization and/or category, level within an organization and/or category, physical attributes, self-selected attributes, determined attributes and the like.

Embodiments data 504 being an external indicia of determining the number of enqueued customers include direct measurement, such as by camera 326, and indirect measurement, such as by determining the number of WiFi enabled devices by antenna 324 or weight upon foot sensor 302, 304. The processor then providing a determined number of enqueued customers from the indirect measurement.

Step 502 determines a response. In one embodiment the response is to do nothing whereby the contact center and/or devices directing queuing operations or for the processing of queue members, is maintained as before. In another embodiment, the response is to increase throughput, whereby step 506 modifies the contact center to reduce time spent by each customer. In another embodiment, step 502 determines the response is to accommodate more individuals in a particular queue, whereby access to the desired queue is increased and/or access to the undesired queue is decreased. In a further embodiment, the environment of the queue is modified, such as by marquee 218, 332 indicating who should and/or should not join a particular queue. In still another embodiment, contact center 106 is modified whereby customer routing is modified to increase or decrease wait time in a particular queue and/or increase or decrease customers entering a particular queue.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of operating a contact center, comprising: receiving, via an electronic communications connection to the contact center, indicia of an enqueued customer of the contact center, wherein the indicia comprises an indirect measurement indicia associated with a number of customers of the contact center and further associated with a factor operable to convert the indirect measurement indicia to an estimated number of customers;

determining, by a processor of the contact center, a response to the enqueued customer, wherein determining includes determining an estimated number of customers by evaluating the indicia and the factor; and
modifying a device directing access to the contact center in accord with the determined response.

2. The method of claim 1, further comprising, observing the indicia of the enqueued customer via an external measurement device in communication with the contact center.

3. The method of claim 1, further comprising:
generating a report that includes at least one of the indicia and the factor; and
delivering the report to at least one of the enqueued customer and an administrator of the contact center.

4. The method of claim 1, wherein:
the factor associated with a number of people, further comprises, an estimated utilization rate of devices producing a certain electromagnetic signal among the number of people; and the indicia is a count of the certain electromagnetic signals.

5. The method of claim 1, wherein:
the factor associated with a number of people, further comprises, an estimated physical attribute among the number of people; and the indicia is a measurement of the estimated physical attribute.

6. The method of claim 1, wherein:
the factor associated with a number of people, further comprises, an estimated ratio of the number of people in an area and the number of people in the area that are also enqueued; and the indicia is a measurement of the estimated ratio.

7. The method of claim 1, wherein, the indicia of an enqueued customer further comprises indicia of where the customer is enqueued.

8. A contact center system, comprising:
a processor;
a network interface;
wherein the network interface is operable to connect, and enable signals therebetween, (i) a contact center to a number of contacts and (ii) the contact center to a queue monitor; and
wherein the processor is operable, in response to signals received by the network interface from the queue monitor, to cause the processor to modify a device directing access to the contact center, wherein the processor is further operable to receive an indicia of an enqueued customer of the contact center, wherein the indicia includes an indirect measurement indicia associated with a number of customers of the contact center and further associated with a factor operable to convert the indirect measurement indicia to an estimated number of customers and in response to the received indicia, determine an estimated number of customers by evaluating the indicia and the factor.

9. The contact center system of claim 8, wherein the processor being operable to modify the device directing access to the contact center, further comprises, the processor being operable to direct a customer from a first queue to at least one queue different from the first queue.

10. The contact center system of claim 8, wherein:
the network interface is further operable connect the contact center to a enqueuing area monitor; and
wherein the processor is further operable, in response to signals received by the network interface from the enqueuing area monitor, to cause the processor to modify the device directing access to the contact center wherein the device modifies the contact center's operations.

11. The contact center system of claim 8, wherein the signal from the queue monitor further comprises a signal of an enqueuing area.

12. The contact center system of claim 8, wherein the signal from the queue monitor further comprises a signal associated with the factor.

13. The contact center system of claim 12, wherein:
the signal from the queue monitor is, further comprises, a signal associated with a number of radio frequency signal associated with a number of devices carried by the number of individuals; and
the factor, further comprises, the number of individuals with the queue estimated to be carrying at least one of the number of devices in a mode operable to generate the radio frequency signal.

14. The contact center system of claim 12, wherein:
the signal from the queue monitor comprises a signal associated with a measured physical attribute an aggregate of the number of individuals; and
the factor, further comprises, the number of individuals estimated to be represented by the measured physical attribute.

15. The contact center system of claim 8, wherein the signal from the queue monitor further comprises a signal of a self-selected attribute of an individual within a queue.

16. The contact center system of claim 8, wherein the processor is operable to modify the device directing access to the contact center, further comprising, causing at least one device of the contact center to present at least a portion of the number of contacts with a set of session options different from a set of options the portion of the number of contacts would have been presented with prior to the modification.

17. The contact center system of claim 8, wherein the processor is operable to modify the device directing access to the contact center, further comprising, causing the contact center to route at least a portion of the number of contacts to a resource different from the resource the portion of the number of contacts would have been routed to prior to the modification.

18. A queue management device, comprising:
a monitor operable to report attributes associated with queue utilization to a processor;
the processor operable to modify a queue environmental factor in response to a reported attribute; and
wherein the queue environmental factor is operable to direct at least one of (i) a time an individual in the queue remains in the queue unprocessed, (ii) a time an individual in the queue is processed, and (iii) the placement of an individual in the queue into a determined sub-queue;
wherein the processor is further operable to modify the device directing access to the contact center in accord with an estimated number of individuals from the reported attribute, the estimated number of individuals from the reported attribute being determined based on an indicia that includes an indirect measurement indicia associated with a number of customers of the contact center and further associated with a factor operable to convert the indirect measurement indicia to an estimated number of customers.

19. The device of claim 18, wherein the monitor is further operable to report attributes associated with a number of individuals indicating a likelihood of entering the queue but not enqueued.

20. The device of claim 18, wherein:
the monitor is operable to report an attribute of a number of individuals associated with queue utilization.

* * * * *